United States Patent [19]
Noda et al.

[11] Patent Number: 5,617,135
[45] Date of Patent: Apr. 1, 1997

[54] MULTI-POINT VISUAL COMMUNICATION SYSTEM

[75] Inventors: Fumio Noda, Palo Alto, Calif.; Koichi Shibata, Kokubunji; Taizo Kinoshita, Musashimurayama, both of Japan

[73] Assignee: Hitachi, Ltd., Tokyo, Japan

[21] Appl. No.: 299,633

[22] Filed: Sep. 2, 1994

[30] Foreign Application Priority Data

Sep. 6, 1993 [JP] Japan ................................. 5-220852

[51] Int. Cl.⁶ .......................... H04N 7/10; H04N 7/14
[52] U.S. Cl. ......................... 348/12; 348/13; 455/5.1
[58] Field of Search ............................. 348/13, 14, 15, 348/17, 16, 12; 455/5.1

[56] References Cited

U.S. PATENT DOCUMENTS

| | | | |
|---|---|---|---|
| 4,302,775 | 11/1981 | Widergren et al. | 348/406 |
| 4,691,233 | 9/1987 | Acampora | 348/419 |
| 5,164,980 | 11/1992 | Bush et al. | 348/17 |
| 5,212,742 | 5/1993 | Normile et al. | 382/56 |
| 5,231,492 | 7/1993 | Dangi et al. | 348/17 |
| 5,253,059 | 10/1993 | Ansari et al. | 348/424 |
| 5,389,965 | 2/1995 | Kuzma | 348/14 |
| 5,392,223 | 2/1995 | Caci | 364/514 |
| 5,400,339 | 3/1995 | Sekine et al. | 348/16 |
| 5,477,542 | 12/1995 | Takahara et al. | 348/14 |

FOREIGN PATENT DOCUMENTS 63-121374  5/1988  Japan.
63-276938  11/1988  Japan.

OTHER PUBLICATIONS

Proceeding D-228 of the Autumn General Meeting of the Institute of Electronics.
William J. Clark, Multipoint Multimedia Conferencing, IEEE Communications Magazine, pp. 44–50 May 1992.

*Primary Examiner*—John K. Peng
*Assistant Examiner*—Nathan J. Flynn
*Attorney, Agent, or Firm*—Antonelli, Terry, Stout & Kraus, LLP

[57] ABSTRACT

A multi-point visual communication system which includes an adaptive filter part for controlling a spatial frequency characteristic of a video signal, a filter selector for selecting a video quality to be transmitted from its own site on the basis of integrated requests received from sites, and a filter control for adaptively controlling a filter characteristic taking both of a video information quantity and situations of a telecommunication network into consideration, and wherein a video signal processed by the adaptive filter part is subjected to an encoding operation and then transmitted to the telecommunication network. Thereby, the video quality can be selected according to users' requests, and the video quality of the multi-point visual communication can be improved without incurring an excessive increase of a video information quantity. Further, through the video signal processing taking both the video characteristic and the telecommunication network situations into consideration, a comparatively high quality of video transmission can be realized when viewed from an information quantity.

18 Claims, 9 Drawing Sheets

MULTI-POINT VISUAL COMMUNICATION SYSTEM

BACKGROUND OF THE INVENTION

The present invention relates to multi-point visual communication systems which connect a plurality of sites for two-way communication of information, more particularly, to a multi-point visual communication system which transmits a large quantity of data such as video or voice information through a predetermined transmission line. The present invention also relates to a multi-point visual communication system which allows control of video and voice quality at signal transmitting and/or receiving side and to a visual signal processing system.

Multi-point visual communication is carried out under such a condition that visual communication systems installed at a plurality of sites are connected to each other via a telecommunication network. There are various types of multi-point visual communication. The visual communication system has a function of subjecting a video signal issued from such a video equipment as a television camera to an analog modulation or digital coding to obtain a modulated or coded signal and then sending the modulated or coded signal to the telecommunication network. The visual communication system also has a function of receiving from the telecommunication network video information sent from the other visual communication systems installed at different sites, reproducing the received video information into a video signal and then outputting a reproduced video signal to such a video equipment as a display unit. The telecommunication network connecting these visual communication systems enables the video information sent from the visual communication systems installed at the respective sites to be distributed to the visual communication systems installed at other sites.

In the prior art multi-point visual communication, the quantity of video information is increased as the number of sites to be connected through the telecommunication network increases, which results in that the communication systems must be high in performance thereby becoming expensive. As the charge for use of the telecommunication network is increased with increased use frequency of the telecommunication network, use of such systems by general users to some extent decreases.

For the purpose of solving these problems, there have been proposed various devices for reducing the quantity of video information in the prior art.

Figure 10:
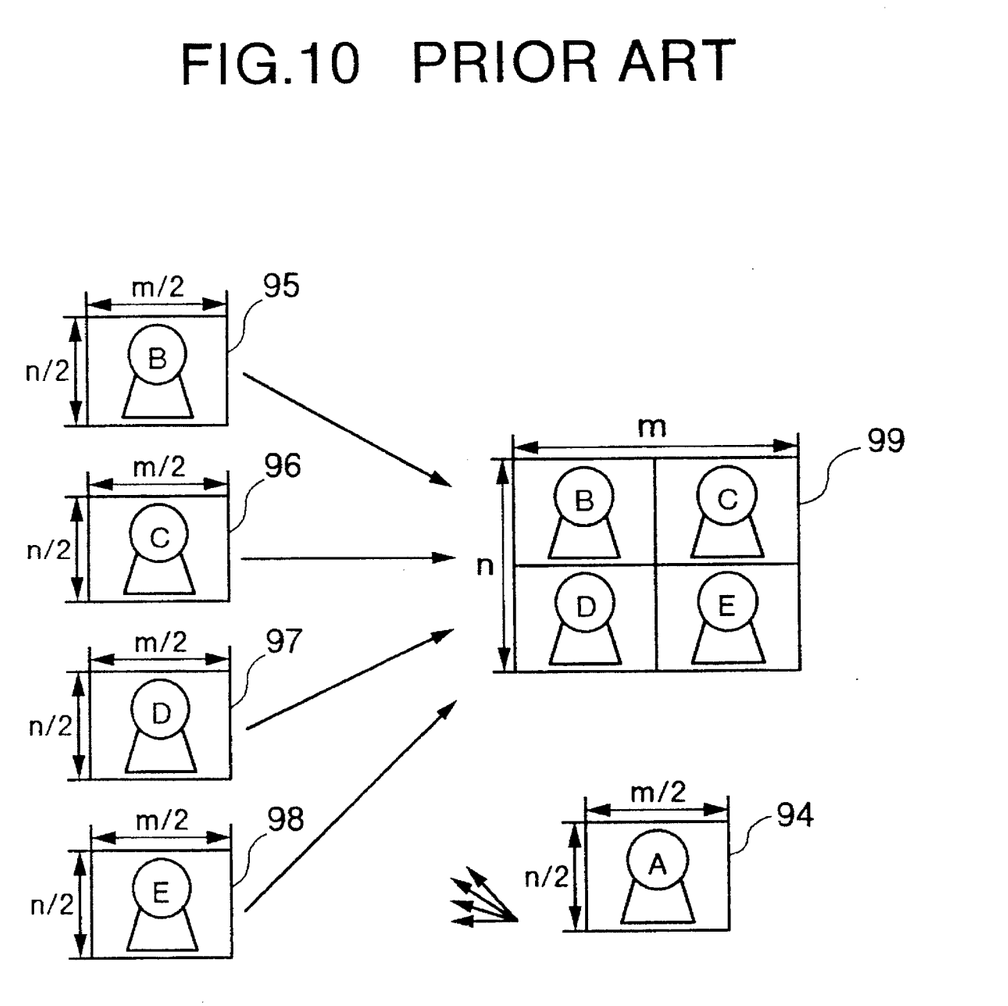
FIG. 10 is a diagram for explaining a prior art multi-point visual communication system.

Disclosed, for example, in JP-A-63-276938 is an example of multi-point visual communication in which the number of picture elements (pixels) in a video signal is reduced to one divided by the number of the parties and then the pixel-reduced video signal is subjected to a coding operation. FIG. 10 is a diagram for explaining the above prior art. More specifically, FIG. 10 shows an example in which visual communication is carried out under such a condition that 5 sites are connected for video display. In this connection, the number of the parties with respect to a terminal in this site is 4. Visual communication terminals installed at the respective sites transmit video information signals 94 to 98 which correspond to reduction of video signals in the pixel number to one divided by the number of the parties (that is, ¼ in this example). The video information signals transmitted from the parties are combined at the terminal in this site as a signal receiving point and displayed on a display screen 99 of m×n pixels of the terminal in this site.

JP-A-63-121374 also discloses a digital coding technique for controlling the quantity of video information according to characteristics such as video motion or inter-frame variation. More in detail, in this case, a low pass filter is provided for cutting off high spatial resolution components so that the ON and OFF operation of the low pass filter is controlled according to the video motion.

Even in a paper reported in Proceedings D-228 of the Autumn General Meeting of The Institute of Electronics, Information and Communicate Engineers of Japan, there is reported an adaptive coding control system for controlling the high-cut performance of a low pass filter according to a variation in the inter-frame of a video signal.

The aforementioned prior art systems have problems which follow. That is, such a prior art multi-point visual communication as mentioned above has a problem that, since increase of the number of sites to be connected causes decrease of the number of pixels in a video signal, the quality of the video signal transmitted from each site is deteriorated. In addition, since the number of pixels in the video signal to be transmitted is uniformly determined, the video quality satisfying users' demand cannot be always obtained.

Further, such video information quantity control as in the prior art has a problem that since the characteristics (variation in the inter-frame of a video signal) alone of a video signal are estimated to suppress a spatial resolution, the above control is unsuitable for dynamic video signal transmission with the truly necessary spatial resolution maintained, which results in that the information quantity control cannot be carried out according also to the situations of a telecommunication network.

SUMMARY OF THE INVENTION

It is an object of the present invention to provide a multi-point visual communication system which can improve video quality of multi-point visual communication while enabling selection of the video quality according to user's demand and while eliminating the need for excessively increasing the quantity of video information. The present invention also provides a video signal processing method in a multi-point visual communication system, that processes the video signal taking into consideration both the characteristics of the video signal and the situations of a telecommunication network thereby realizing a relatively high quality of video signal transmission compared to its information quantity.

In accordance with an aspect of the present invention, the above object is attained by providing a multi-point visual communication system which comprises filter means for adaptively controlling a spatial frequency characteristic of a video signal, means for selecting one of filters corresponding to the quality of a video signal to be transmitted from a terminal in a site according to user's demand at each of the other sites, and means for controlling a characteristic of the selected filter taking both the quantity of information in the video signal and the situations of a telecommunication network into consideration, and wherein the video signal processed through the selected filter is subjected to an analog modulation or a digital coding operation and then transmitted to the telecommunication network. In the video signal processing operation of the above respective means, the characteristic of the filter means is adaptively controlled so that the video information quantity and video quality become optimum.

The above filter means acts to perform its processing operation over the video signal on every field or frame basis to adaptively correct the spatial frequency characteristic of the video signal. The means for selecting the video quality integrates users' demands from the respective sites and selects such a filter characteristic that can provide the optimum video quality. The means for controlling the characteristic of the filter means detects the quantity of video information, grasps the situations of the telecommunication network, and controls the filter characteristic so as to provide the optimum balance between the video quality and information quantity. Under these operations, a desired video quality by each user can be selected and the video signal, the spatial frequency characteristic of which was adaptively corrected according to both of the video information quantity and telecommunication network situations, can be transmitted.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 7 is a block diagram of an adaptive filter part 11;

DESCRIPTION OF THE PREFERRED EMBODIMENTS

Embodiments of the present invention will be detailed with reference to the accompanying drawings.

Figure 1:
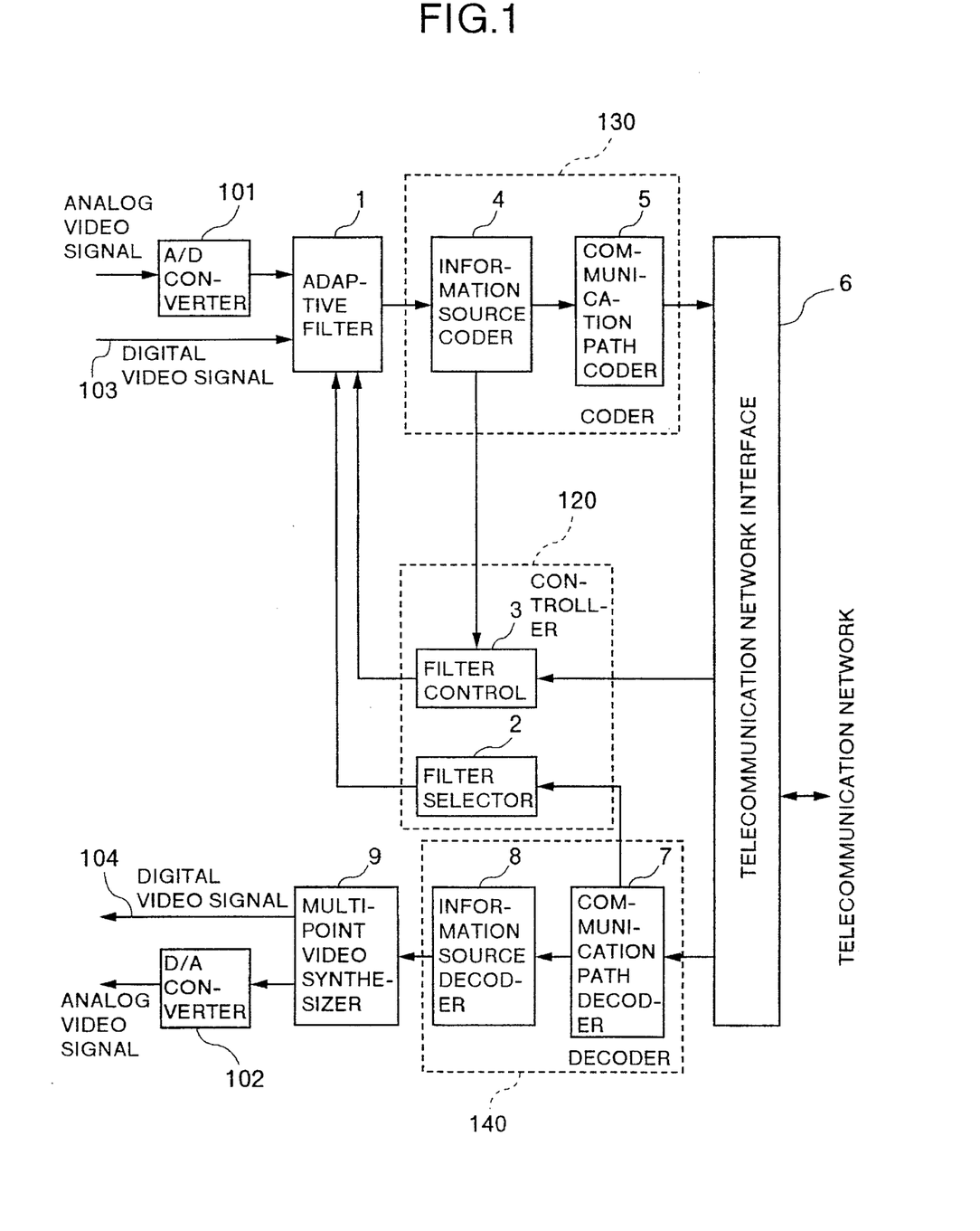
FIG. 1 is a block diagram of a multi-point visual communication system in accordance with an embodiment of the present invention.

Referring first to FIG. 1, there is shown a multi-point visual communication system in accordance with an embodiment of the present invention. The illustrated system receives an analog or digital video signal, subjects the received signal to a coding operation and communicates with a plurality of sites through a digital telecommunication network.

In the case where the input signal is of a digital type, a signal line 103 is employed. In the case where the input signal is of an analog type, the input signal is converted by an A/D converter 101 into a digital signal and then applied to an adaptive filter part 1. Similarly, in the case where an output equipment (not shown) is to receive a digital signal, a signal line 104 is employed; whereas, in the case where the output equipment is to receive an analog signal, a digital signal is converted by a D/A converter 102 into an analog signal and then outputted.

The adaptive filter part 1 disassembles the input video signal into images each corresponding to one field or frame thereof and subjects the disassembled images to a digital signal processing operation to correct spatial frequency characteristics of the images in horizontal and vertical directions. When the input signal is a digital video signal based on Rec. 601 specifications of the Comite Consultatif International des Radio-communications (CCIR), the system receives the input video data as it is and performs a predetermined filtering operation over the input signal. As already explained above, when the input signal is an analog video signal, the input signal is subjected at the A/D converter 101 to a conversion into a predetermined digital signal for the next processing. When an output of an external video equipment or a computer video equipment is different from the above video signal in specifications, i.e., is an RGB or YUV signal, the video signal must be subjected to a conversion prior to input thereof to the video equipment. However, in the case of, in particular, a digital component signal, a predetermined input/output interface is separately used and the adaptive filter part 1 of the present invention is used as it is.

A controller 120 is made up of a filter selector 2 for selecting a filter characteristic according to users' demands at multiple points and a filter control 3 for controlling the characteristic of the selected filter.

The filter selector 2 functions to select the quality of a video signal to be transmitted from its own site according to users' demands at the respective sites and to select the filter characteristic of the adaptive filter part 1. The filter selector 2 functionally comprises means for receiving video quality request signals transmitted from the respective sites, means for storing the levels of the requested video qualities and the respective sites associated therewith, and means for outputting a signal for selection of the filter characteristic to the adaptive filter part 1. The filter selector 2 also acts to control the selection of the filter characteristic according to a predetermined algorithm in such a manner that the selected filter characteristic causes the optimum quality of the video signal intended to be sent to the respective sites under given communication conditions. In the present embodiment, explanation will be made in connection with the case where the video quality is prescribed in terms of the spatial resolution and 3 types of filter characteristics are selected on the basis of resolution levels. However, the present invention may be arranged so that the number of resolution levels is increased and the video quality is prescribed in terms of transmission frame number or the like to expand the selection range of the video quality. Further, although the video quality request signal transmitted from each site has been received at the filter selector 2 through a communication path decoder 7 in FIG. 1, such an arrangement may be possible that an interrupt is applied directly from a communication network interface 6.

The filter control 3 is provided to integrate a video information quantity at an information source coder 4 and a telecommunication network situation at the telecommunication network interface 6 and to a filter coefficient determining the filter characteristic of the adaptive filter part 1. The present embodiment is arranged so that a set of several types of filter coefficients having different spatial frequency characteristics is previously set in the adaptive filter part 1, and the filter control 3 extracts such a filter characteristic that the video information quantity to be transmitted is optimized in a range not exceeding the ability of the telecommunication network to control the filter coefficients of the adaptive filter part 1. The extraction control of the filter characteristic may be carried out by also looking up the video information quantity of the information source coder 4 and the telecommunication network situation of a communication path coder 5.

An encoder 130 having the information source coder 4 and the communication path coder 5, the telecommunication network interface 6, and a decoder 140 having the communication path decoder 7 and an information source decoder 8 are provided to apply a video communication technique for performing low bit-rate coding operation utilizing the statistical properties of images to the present embodiment. The information source coder 4 subjects video data processed at the adaptive filter part 1 to quantizing, code assigning and layered coding operations to compress the video information. The communication path coder 5 attaches header information, an error correction code and the like to the input signal depending on the telecommunication network and sends video information to the telecommunication network through the telecommunication network interface 6. The communication path decoder 7 and the information source decoder 8, as opposed to the information source coder 4 and the communication path coder 5, receives the video information from the telecommunication network through the telecommunication network interface 6 and restores video data for the respective sites. In particular, in the present embodiment, different qualities of video signals can be transmitted to multiple different sites in the form of codes respectively and video information of a quality requested by its own site can be received from each site. Though not clearly shown in FIG. 1, the embodiment of FIG. 1 is also provided with a function of communicating with the party in the form of voice simultaneously with video and a function of transmitting a request signal which requests the associated site to transmit the quality of video information for the site. Though not illustrated, the multi-point visual communication system of FIG. 1 is also provided with means for controlling the start and end of communication and connection between multiple sites.

A multi-site video synthesizer 9 combines video data transmitted from the respective sites into a composite signal corresponding to a single screen image or a plurality of screen images and outputs the composite signal as a digital video signal. The number of screens to be combined is limited by the capacity of a built-in frame memory, but the locations of the multi-site video images in each screen can be freely set by an external input. When an input of an external display device is an analog video signal, the digital video signal of the multi-site video synthesizer 9 is converted at the D/A converter 102 to a predetermined analog video signal and then outputted to the display device.

Figure 2:
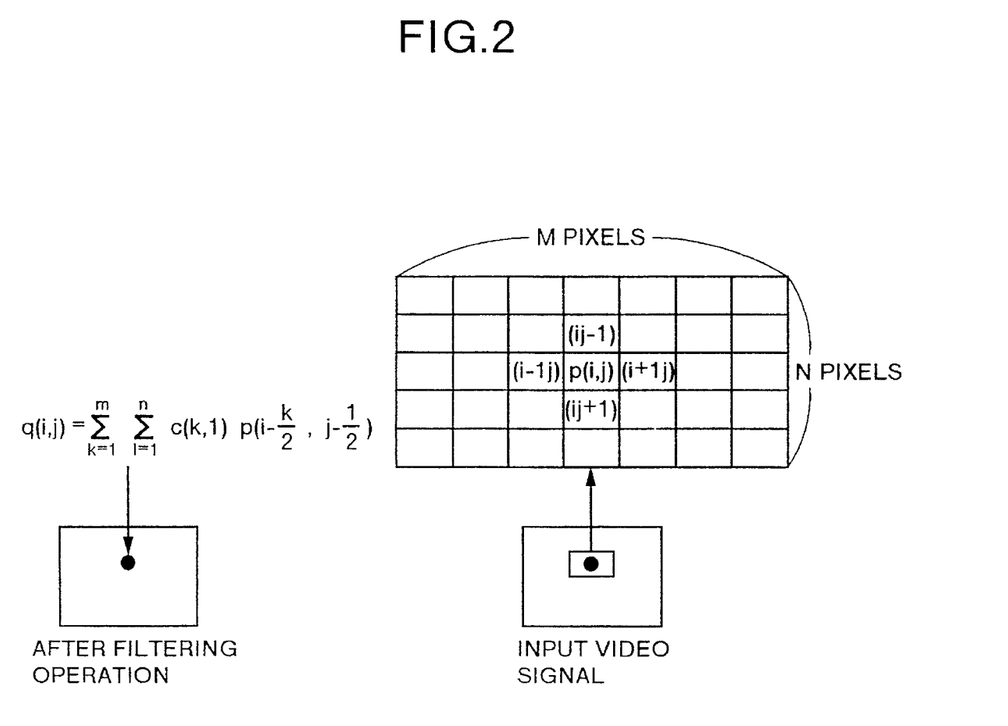
FIG. 2 shows diagrams for explaining a filter processing method in an adaptive filter.

FIG. 2 is a diagram for explaining the processing procedure of the adaptive filter part 1 in the embodiment of FIG. 1. An input video signal is handled as continuous two-dimensional images each corresponding to one field or frame, and each image is subjected to the following arithmetic operation.

First, suppose that a two-dimensional image to be processed comprises one block of m×n pixels (m or n being a natural number) having a center pixel $p(i,j)$ and digital signal levels of these pixels within the block form a single matrix. Matrix operation is carried out between the above level matrix and a matrix of filter coefficients $c(k,l)$ to obtain a result $q(i,j)$, and the obtained result $q(i,j)$ is handled as filter processed values for the pixel $p(i,j)$. The filter coefficient $c(k,l)$, which indicates the filter characteristic of the adaptive filter part 1, is used for calculation of a coefficient selected and controlled by the filter selector 2 and filter control 3. The calculation is carried out with respect to all the pixels within the 2-dimensional image to obtain the processed values $q(i,j)$, and an image expressed by the obtained processed values ($q(i,j)$ is handled as video data after the filter processing. In this connection, the size of the m×n pixel block is designed to be automatically determined by the size of a selected filter coefficient matrix. In the case where it is impossible to secure a block of m×n pixels through the operation of the pixels around the image, the lacking pixel values are obtained by interpolation or by modifying the filter coefficients so as not to generate any operational error.

The video signal has been handled as a 2-dimensional image in the processing method of FIG. 2. However, in the case where the adaptive filter part 1 has a higher-speed and larger-capacity processing performance, several of frames in the video signal may be arranged as a set so that the video signal is handled as a 3-dimensional image for 3-dimensional filtering operation. In this case, it is possible to modify not only the spatial frequency characteristic but also the time solution or the spatial resolution suitable for the image motion.

Figure 3A:
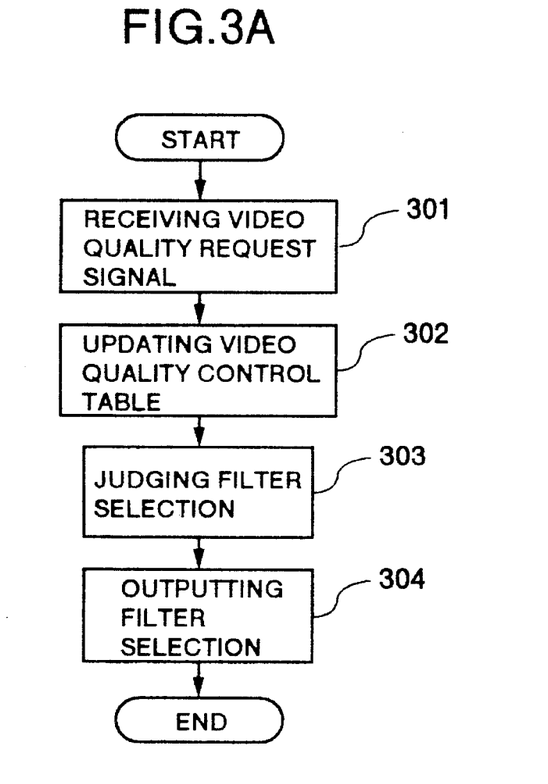
FIGS. 3A and 3B are diagrams for explaining how to select filters.
Figure 3B:
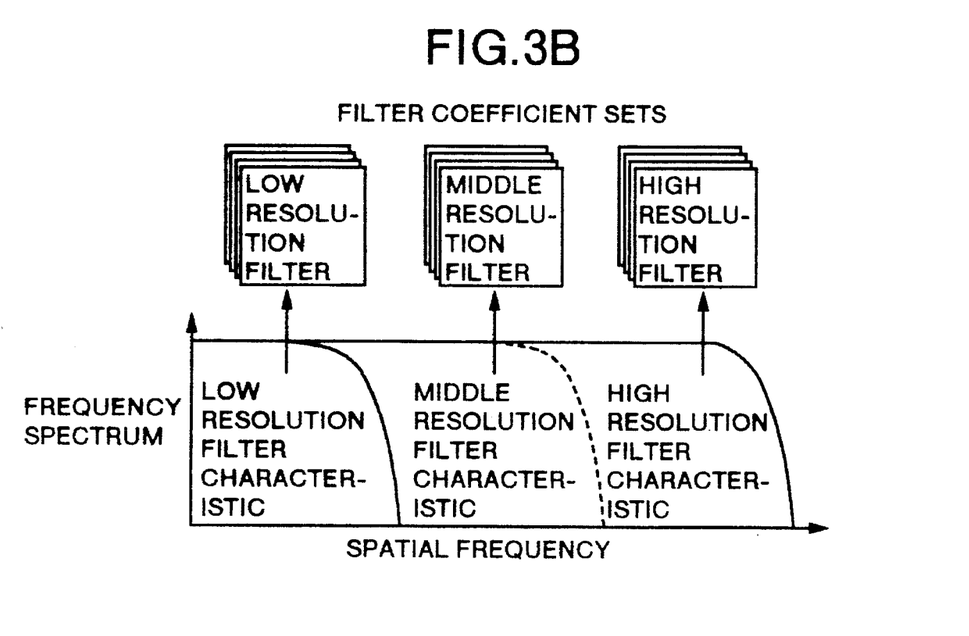

FIGS. 3A and 3B show diagrams for explaining the selecting procedure of the filter selector 2 in the embodiment of FIG. 1. More specifically, FIG. 3A schematically shows a flow of filter selection algorithm, and FIG. 3B shows, in a model form, a relationship between filter characteristic and video quality.

The filter selector 2, when receiving the video quality request signal transmitted from each site, starts the filter selection algorithm. The video quality request signal in the present embodiment is used to designate the level of the video quality to cause a desired quality of video information to be transmitted from the designated site. When the filter selector 2 receives the video quality request signal (block 301 in FIG. 3A), the filter selector updates a video quality control table having video quality levels with respect to the respective sites stored therein (block 302), and then performs filter selection (block 303). When the multi-point visual communication is started or a new site is participated, this request signal will be often transmitted. When a video quality control table having a predetermined standard value previously stored therein is prepared, video transmission can be possible even before updating of the requests from all the sites is completed. In the filter selecting operation of the block 303, the block 303 classifies the sites depending on the same request quality by looking up the updated video quality control table and selects the associated filter characteristic corresponding to the associated quality. The block 303, after completing the filter selecting operation, outputs its selection result to the adaptive filter part 1 (block 304) and holds the output result until the next result comes.

In the present example, there are 3 sorts of filter characteristics to be selected. These filter characteristics are expressed by such a spatial frequency spectrum as shown in FIG. 3B. These filter characteristics are realized basically by low pass filters which eliminate high spatial frequency components and correspond to 3 sorts of video qualities of high, middle and low resolutions respectively. The filter characteristics of the respective resolutions are previously prepared in the adaptive filter part 1 respectively in the form of a predetermined size of filter coefficient matrix (e.g., a 5×3 matrix for the high-resolution filter). Further, several sorts of filter coefficients exhibiting different frequency spectrum characteristics are previously prepared for each resolution so that the spatial resolution can be adaptively changed according to the control of the filter control 3. In the filter selecting operation of FIG. 3A, one of these filter coefficient sets corresponding to the video quality is selected.

In the present embodiment, the information source coder 4 has a performance of coding video data corresponding to 3 sorts of resolutions and the selection algorithm of the filter coefficients is relatively simple. For example, at the time of starting the multi-point visual communication, the filter selector is designed to previously select the middle-resolution filter with respect to all the sites. When the system receives video quality requests indicative of high, middle and low resolutions from different 3 sites for example, the filter selector selects the resolution filter coefficient set corresponding to the demands of the respective sites. When all the sites request the same video quality, the filter selector selects the requested resolution filter coefficient set and transmits the same quality of video information to all the sites. In this case, the higher the resolution is the much the video information quantity is, but such a merit that all the users can satisfy their video qualities is preferential. Since the information source decoder 8 and the multi-site video synthesizer 9 have their limitation in performance and also in the video information quality for one site to be able to receive and reproduce the signal, the video information quantity can be prevented from being excessively increased.

On carrying out the present invention, there sometimes occurs such a case that the information source coder can encode, e.g., the video data corresponding only to two sorts of resolutions. In such case, there may be considered such various filter selection algorithms that video quality requests from respective sites are integrated to select optimum 2 of 3 sorts of filter characteristics. For example, when request qualities from the respective sites are classified into 3 sorts, such a rule may be provided that selection assignment is carried out in the decreasing order of the number of identical-quality request sites. In short, the present invention is featured in that the filter selection algorithm can be set so that the qualities of video signals to be transmitted to the respective sites become optimum under given communication conditions.

Figure 4:
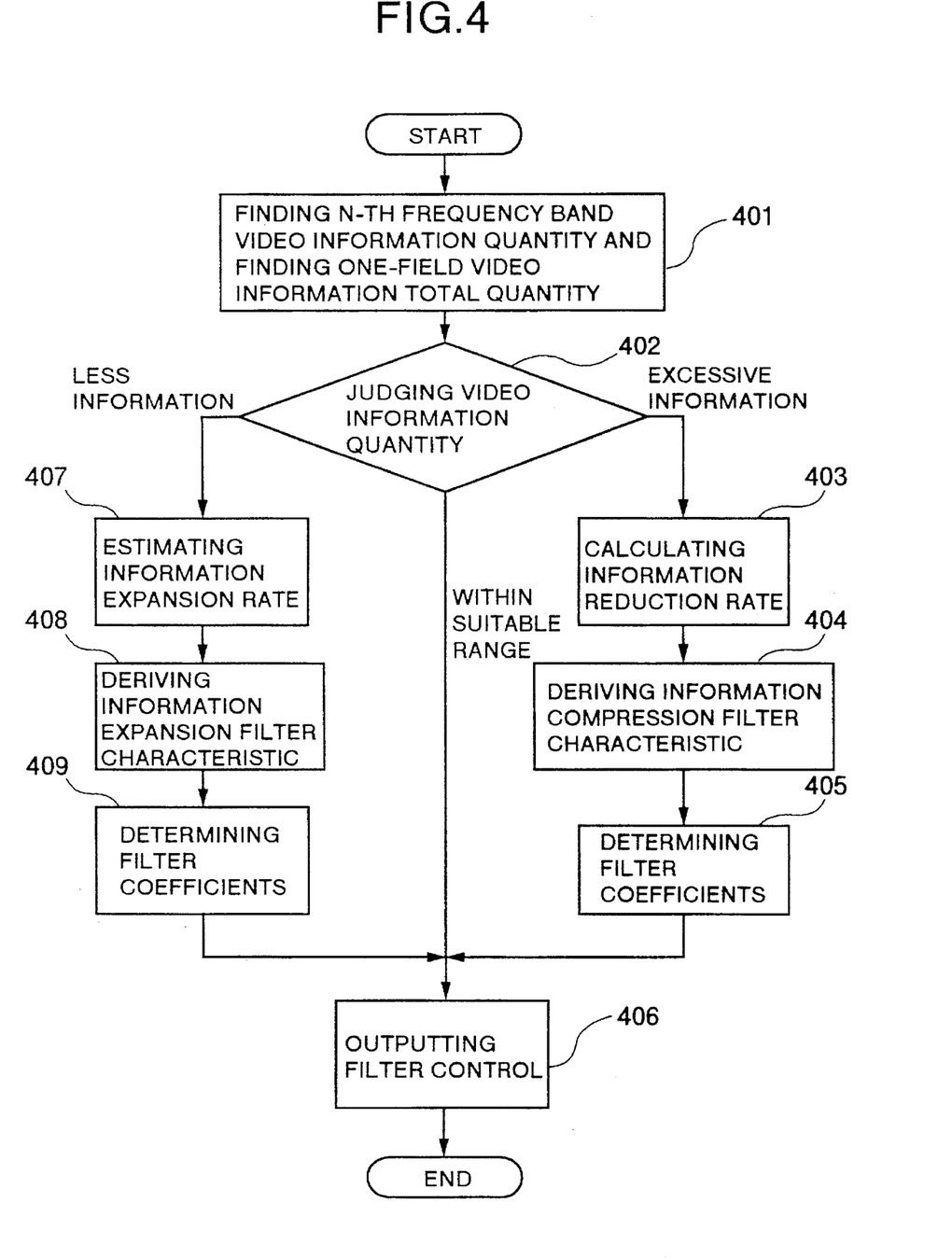
FIG. 4 is a block diagram for explaining filter control.

Shown in FIG. 4 the operation of the filter control 3 of the controller 120 in FIG. 1. The filter control 3 divides the spatial frequencies of video data of the information source coder 4 into a plurality of frequency bands, and calculates video information quantities for the respective bands to be used for control of the filter coefficients. As quantities indicative of the situations of the telecommunication network, a transmission information quantity and a transmission wait information quantity per unit time in the telecommunication network interface 6 are looked up. For simplicity of the explanation, in this example, explanation will be made in connection with the case where the spatial frequency is replaced by the frequency bands of a video signal. This is intended, in short, to classify video data into layered ones depending on a quantity indicative of the level of the video quality to grasp information quantities for the respective layers. For example, the magnitudes of Fourier coefficients obtained through Fourier transform of a video signal or DCT coefficients obtained through discrete cosine transform (DCT) of the signal may be used.

First, the filter control 3 divides a video signal, e.g., a brightness or luminance signal into frequency bands on every 1 MHz basis, finds a video information quantity contained in the n-th frequency band, and also finds a total amount of such video information quantities for every field or frame (block 401 in FIG. 4). The filter control 3 next compares the obtained video information total quantity with a quantity transmittable to the telecommunication network to judge whether or not it is necessary to change the filter coefficients (block 402). In this connection, the network transmittable quantity is predictively obtained by multiplying the transmission information quantity per unit time and the transmission wait information quantity by a safety coefficient, and is set so as to be suitably modified according to the type of the telecommunication network and the traffic thereof in use. For example, when the video information total quantity is within a range of 0.5–1.5 times the transmittable quantity, the block 402 judges that modification of the filter coefficients is unnecessary and holds the previous filter control output result as it is. When the video information total quantity exceeds the transmittable range, the filter control 3 shifts its operation to its filter-coefficient change procedure.

More in detail, when the video information total quantity exceeds the transmittable range, for example, the filter control 3 calculates a ratio of the video information total quantity to the transmittable quantity to find an information reduction rate (block 403), and derives such a filter characteristic that corresponds to a multiplication of the information quantities of the respective frequency bands by the information reduction rate or to the compressed information quantities (block 404). Next, the filter control 3 determines filter coefficients indicative of the filter characteristic (block 405) and outputs its result from the filter control output (block 406) to the adaptive filter means 1. In practical, sets of filter coefficients corresponding to combinations between different frequency bands and different spatial frequency characteristics are previously set in the adaptive filter means 1 so that the filter control 3 can select the nearest filter coefficients among them. When the video information total quantity is less than the transmittable quantity, the filter control 3 compares the video information quantities of the respective frequency bands with the compression rate of the current filter characteristic to estimate information expansion rates for the respective bands (block 407) and derives a new filter characteristic based on the estimated values (block 408). Thereafter, the filter control 3 determines filter coefficients indicative of the filter characteristic (block 409) and sends it to a filter control output part (block 406).

With such arrangement and operation of the embodiment of FIG. 1 as mentioned above, the filter characteristic of the adaptive filter means is varied depending on users' demands at the respective sites and the spatial frequency characteristic of the video signal is corrected and then transmitted, whereby the quality of the video signal to be received by each user can be freely selected. In this case, since the total quantity of video information to be transmitted to the telecommunication network is restricted by the decoding/reproducing performance of the signal receiver side, excessive increase in the video information quantity can be prevented even when the video quality is improved. Further, since the filter characteristic of the adaptive filter means is controlled taking into consideration both the video information quantity obtained by evaluating the spatial frequency characteristic of a video signal and the situations of the telecommunication network, the video information quantity can be reduced according to the communication conditions and the video signal having a necessary spatial resolution kept at a suitable level can be transmitted. Since the adaptive filter means performs its calculating operation with use of filter coefficients indicative of the selected filter characteristic, the processing of the video signal can be facilitated by changing the size of the filter coefficient matrix, the values of these coefficients, etc.

Further, so long as the adaptive filter means is provided with a suitable high-speed operational performance, real time processing can be sufficiently possible and this signal processing causes substantially no danger of incurring a communication delay.

The present embodiment has been arranged to handle video signals based on ordinary television broadcasting specifications. However, when the present invention is arranged to handle preciser video signals and computer video signals, the aforementioned operation holds true for this case with substantially the same effect as the above. Further, the telecommunication network for multi-site connection is also not limited to the digital telecommunication network, and the present invention may be applied to a video transmission system of analog type.

Figure 5:
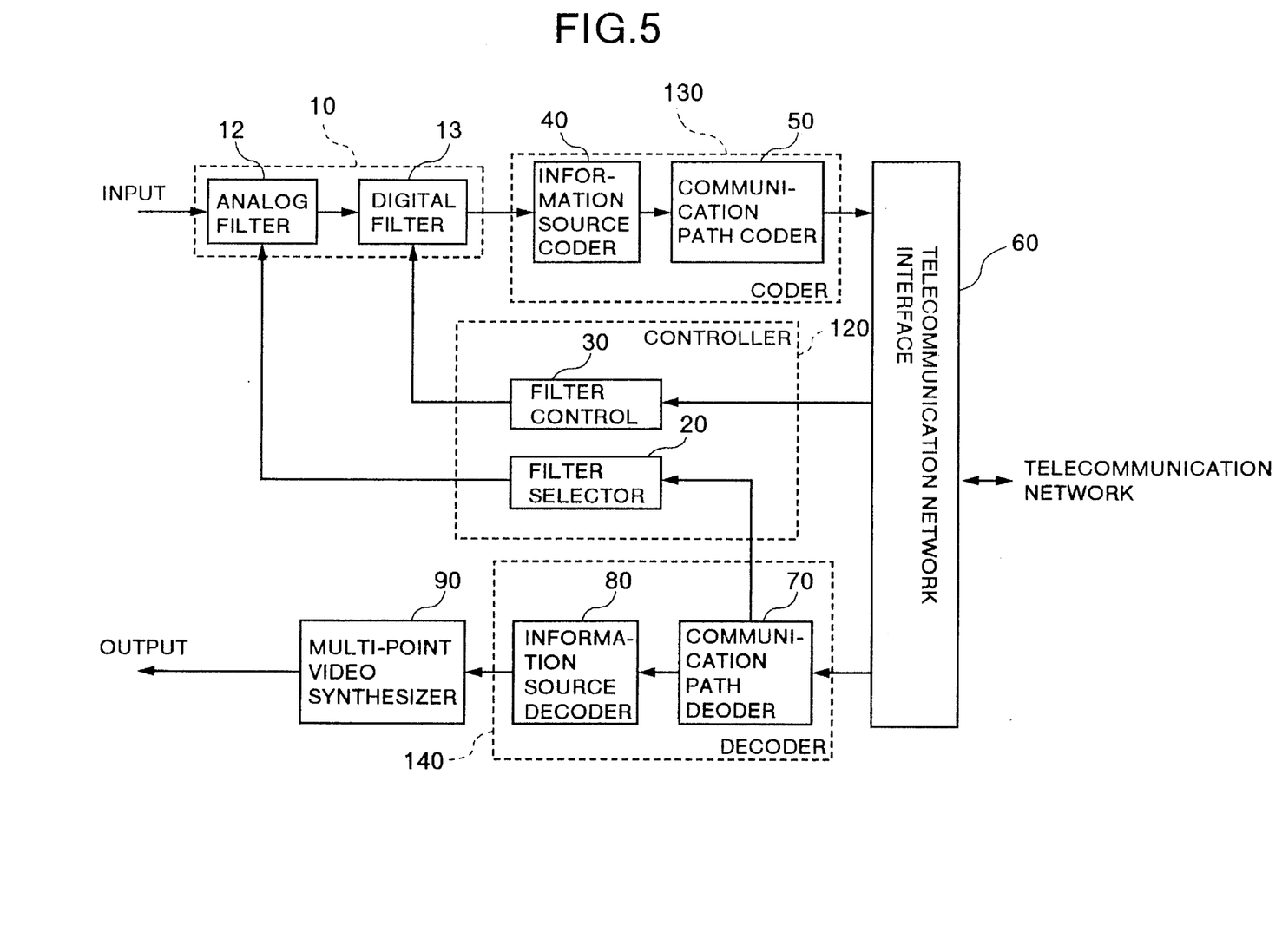
FIG. 5 is a block diagram of a multi-point visual communication system in accordance with another embodiment of the present invention.

FIG. 5 shows an embodiment of a multi-point visual communication system including a modification of the adaptive filter part 1 in FIG. 1. This system is arranged to receive and encode an analog video signal, and communicate with a plurality of sites through a digital telecommunication network. Among the major elements of the system of FIG. 5, an information source coder 40, a communication path coder 50, a telecommunication network interface 60, a communication path decoder 70, an information source decoder 80 and a multi-point video synthesizer 90 have substantially the same functions as the corresponding ones in the embodiment of FIG. 1. The present embodiment is featured in that an adaptive filter part 10 has an analog filter 12 and a digital filter 13, a filter selector 20 controls the analog filter 12, and a filter control 30 controls the digital filter 13. More specifically, the filter selector 20 receives video quality request signals from users at respective sites, integrates these request signals, and selects a filter characteristic prescribing a video quality to be transmitted from its own site. The filter selector 20 sends its selected result to the analog filter 12 where the selected result is subjected to a filtering operation so that the spatial frequency characteristic of the input video signal corresponds to the selected video quality. The filter control 30, on the other hand, integrates a video information quantity at the information source coder 40 and telecommunication network situations at the telecommunication network interface 60, and adaptively controls the filter characteristic of the digital filter 13 in such a manner that the balance between the video quality and information quantity becomes optimum.

In this way, in the embodiment of FIG. 5, the analog filter 12 can roughly control the spatial frequency characteristic of the video signal and the digital filter 13 can finely control it. In this case, the circuit size of the digital filter 13 can be made smaller than that in the embodiment of FIG. 1. Further, even when it is desired to eliminate, e.g., high components of the spatial frequency characteristic, the spatial frequency characteristic is first subjected to the analog filtering operation. As a result, this embodiment has a merit that the embodiment can reduce Nyquist distortion or the like when compared with the case where the signal is fully digitally processed and the video quality after the filtering operation is high. Further, the analog filter 12 may be made up of a plurality of LC filters which can be switched by means of a switch, whereby the analog filter 12 can be inexpensively realized. Although the control systems of the analog filter 12 and digital filter 13 have been carried out respectively separately in the present embodiment, the control systems may be suitably modified according to the application situations, so long as, in short, the spatial frequency characteristic of a video signal to be transmitted from its own site is selected based on requests from the respective sites and the spatial frequency characteristic is adaptively controlled taking both of the video information quantity and the telecommunication network situations into the consideration.

Next, an output of the analog filter 12 is subjected at an encoder 130 to a DCT quantizing operation and then at a decoder 140 to a reverse DCT quantizing operation, which will be explained below in connection with an example.

Figure 6:
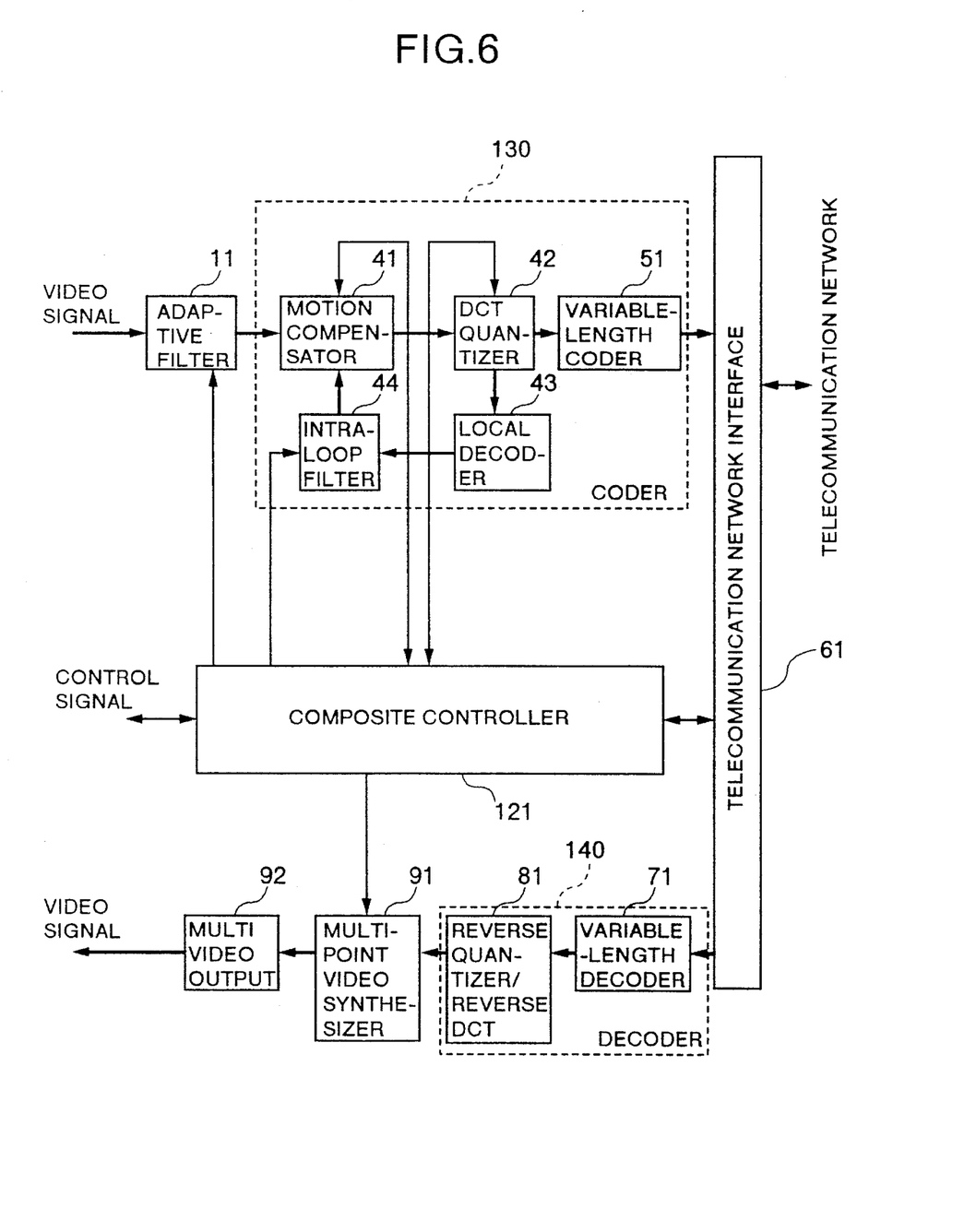
FIG. 6 is a block diagram of a multi-point visual communication system in accordance with a further embodiment of the present invention.

FIG. 6 is an multi-point visual communication system when connected to such a control device as a personal computer or a workstation to form a multi-point visual conference system. A decoder controller 121, in addition to a function of the adaptive filter control of the controller 120, receives and sends control signals for coding control including motion compensation, intra-loop filter and quantization, and also receives signals for multi-point connection between the respective sites, decoding control of video signals from the respective sites and synthesizing control of the multi-point video signals. These control signals are used to synthesize the received video signals and then to output the composite signal to a display unit attached with a controller. A video signal at it own site is photographed with use of a small video camera or the like and then inputted to this multi-point visual communication system.

In the embodiment of FIG. 6, the input video signal is processed at an adaptive filter circuit 11, subjected at a encoder 130 based on a motion compensation DCT system to an encoding operation, and then transmitted to the respective sites via a telecommunication network. The telecommunication network may comprise, for example, a packet telecommunication network. A motion compensation circuit 41 compares the current image of one of fields or frames of the video signal with an image previous by one field or frame thereto to detect a video motion, and selects on the basis of the magnitude of the detected motion whether the current image is encoded as it is (intra-field/intra-frame coding) or the current image is compared with the previous image to find a differential value therebetween and the differential value is encoded (inter-field/inter-frame coding). A DCT quantization circuit 42 converts image data received from the motion compensation circuit 41, e.g., for every 8×8 pixel block into DCT coefficients and quantizes the obtained DCT coefficients according to a quantization table. The obtained result is sent from the DCT quantization circuit 42 to both of a local decoder circuit 43 and a variable-length coder circuit 51. The local decoder circuit 43 restores the received coded data again to the original image data and sends the restored image data to a intra-loop filter circuit 44 to locally correct the resolution characteristic. The intra-loop filter circuit 44 sends the corrected resolution characteristic to the motion compensation circuit 41 to be used for encoding of the next image at the circuit 41. The variable-length coder circuit 51 assigns a predetermined code to the quantized data, attaches a header indicative of the contents of the data and an error correction code thereto, and then sends it to a telecommunication network interface 61. The telecommunication network interface 61 transmits the coded data based on the situations of the telecommunication network. When the packet telecommunication network is used, the telecommunication network interface 61, based on the situations of the packet telecommunication network, assembles the coded data into a suitable size of packet, attaches header information thereto and then transmits it to the packet telecommunication network.

Meanwhile, video signals transmitted from other sites are received into the telecommunication network interface 61, and then passed through a variable-length decoder circuit 71, a reverse DCT circuit 81 and a multi-point video synthesis circuit 91 to be decoded into the original video data. The video data of the respective sites are located at suitable zones of a video memory provided in the multi-point video synthesis circuit 91 so that a multi-video output circuit 92 reads out these data from the memory and outputs them as a video signal.

The characteristic control of the adaptive filter circuit 11 in the present embodiment can be carried out under control of an external controller via the composite control circuit 31. In the illustrated example, the composite control circuit 31, which is made up of a microprocessor, a memory and various interfaces, functions to perform autonomous and passive controls including multi-point connection control, adaptive filter control, multi-point video synthesis control and coding/decoding control. In particular, the present embodiment is featured in that the control of the adaptive filter circuit 11 and the coding control can be linked each other to be simultaneously carried out.

The composite control circuit 31 grasps the image motion detection quantity of the motion compensation circuit 41, the quantization code quantities of the DCT coefficients of the DCT quantization circuit 42, and the code quantity of the variable-length coder circuit 51, and collects image information quantity for every field or frame. The telecommunication network interface 61 and the variable-length coder circuit 51 detect the packet quantity to be transmitted to the packet telecommunication network and the transmission wait packet quantity and predicts a transmittable quantity to the packet telecommunication network. On the basis of the obtained image information quantity and transmittable quantity, the system determines the filter characteristic of the adaptive filter circuit 11, modifies the motion detection accuracy and the quantization table, and also controls the intra-loop filter characteristic. Meanwhile, the video quality request signals transmitted from the respective sites are also integrated at the composite control circuit 31 to select the filter characteristic of the adaptive filter circuit 11 corresponding to the video quality to be transmitted to the respective sites. As a result, the spatial frequency characteristic of a video signal to be transmitted from its own site is selected based on the requests from the respective sites, and the adaptive filter circuit 11 and the coder circuit cooperatively perform adaptive control over the spatial frequency characteristic taking both of the video information quantity and the telecommunication network situations into consideration. For example, even for such a video signal that a quantization distortion is remarkable, in accordance with the present embodiment, coding with less distortion can be realized when the table is modified into a table having finer quantization steps and instead the adaptive filter circuit 11 smooths the spatial frequency characteristic.

Although the above control has been autonomously carried out by the composite control circuit 31, the control may be arranged so as to able to control how to select the filter characteristic and quantization table, e.g., under control of an external controller. In the latter case, a short-duration characteristic variation in the video signal can be followed by the composite control circuit 31, while such a long-duration characteristic variation therein such as a variation in an image scene or camera angle can be adjusted by the user himself.

Figure 7:
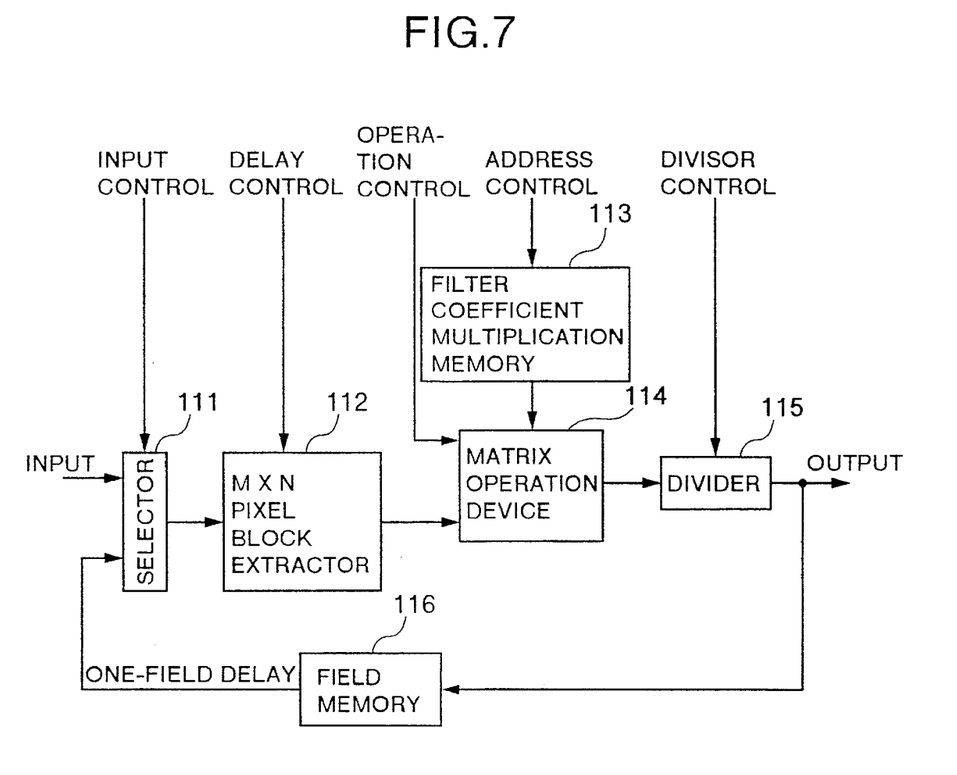

Shown in FIG. 7 is an example of block configuration of the adaptive filter circuit 11 in the embodiment of FIG. 6.

The basic constituent elements of the circuit of FIG. 7 include a selector 111 for selecting input video data, an extraction circuit 112 for sequentially selecting data of an m×n pixel block from one field of image, a filter coefficient multiplication memory 113, a matrix operation device 114, a divider 115, and a field memory 116. These circuit elements are controlled by the control signal received from the composite control circuit 31 to execute filtering operation based on the selected filter coefficients.

That is, the filter coefficient multiplication memory 113 is subjected to an address control for every field of the video signal to send the filter coefficients (multiplication) specified by the address to the matrix operation device 114. This address control is arranged to be switched, for example, at a suitable time during a field flyback period. The matrix operation device 114 multiplies a plurality of pixel data subjected at the selector 111 to the input control and selected at the block extraction circuit 112 by the filter coefficients received from the filter coefficient multiplication memory 113 to obtain products therebetween, and outputs a total sum of the products. The size of this operation block, which is previously determined by the selected filter characteristic, is correctly controlled by the delay control of the block extraction circuit 112 and by the operation control of the matrix operation device 114. The divider 115 divides the product-sum result of the matrix operation device 114 by a divisor specified by the division control operatively linked with the address control, and outputs its filtering operation result. In this connection, in the case where the matrix operation device 114 can perform floating point arithmetic operation, when filter coefficients including divisors are previously stored in the filter coefficient multiplication memory 113, the divider 115 can be omitted.

In particular, the adaptive filter circuit 11 of FIG. 7, when extracting only particular field images from the input video signal and performing repetitive operation between consecutive 2 fields, can perform such filtering operation as to output video data corresponding to different video qualities. For example, when it is desired to process only odd-numbered fields of the input video signal, the selector 111 controllably selects the input data during odd-numbered fields and the one-field-delayed data received from the field memory 116 at even-numbered fields. The input data of the odd-numbered fields are passed first through the matrix operation device 114 to be subjected to the filtering operation to provide a resolution corresponding to a first video quality. This result is outputted from the adaptive filter circuit 11 and also saved in the field memory 116. During the even-numbered field periods, the even-numbered field data subjected to the once filtering operation is again passed through the matrix operation device 114 to be subjected thereat to the filtering operation to provide a resolution corresponding to a second video quality. In this way, the video data of the first resolution is outputted from the adaptive filter circuit 11 during the odd-numbered field periods, and then the video data of the second resolution is continuously outputted therefrom during the even-numbered field periods. In this case, the filter coefficients may be changed for every field, and even when the filter coefficients are not changed, the second resolution is generally lower than the first resolution. The aforementioned operation is not limited always to the every-field operation, but may similarly be such operation that particular frame images alone are extracted to perform repetitive operation between consecutive 2 frames.

Figure 8:
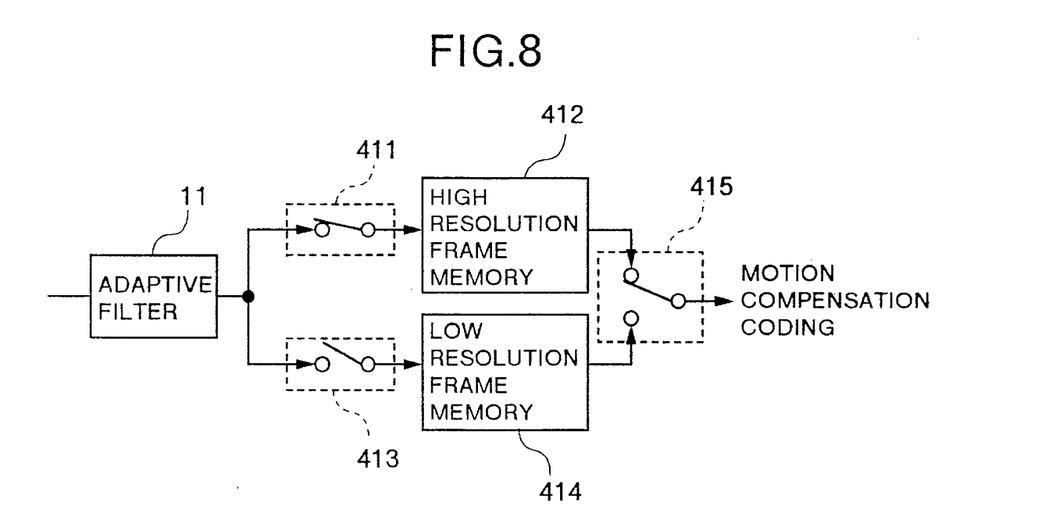
FIG. 8 is an arrangement of a transfer circuit in the embodiment of FIG. 6.

FIG. 8 shows an example of arrangement of a transfer circuit for transferring different resolutions of data from the adaptive filter circuit 11 to the motion compensation circuit 41 in FIG. 7. This transfer circuit is provided between the adaptive filter circuit 11 and the motion compensation circuit 41. In this example, more specifically, two change-over switches 411 and 413, high- and low-resolution frame memories 412 and 414 connected to the change-over switches 411 and 413, and a third change-over switch 415 are provided at the preceding stage of the motion compensation circuit 41. For example, when it is desired to output the high-resolution video data during the odd-numbered field periods and to output the low-resolution video data during the even-numbered field periods, the change-over switches 411 and 413 are turned ON and OFF for every field so that the high-resolution video data is stored in the high-resolution frame memory 412 while the low-resolution video data is stored in the low-resolution frame memory 414. Further, the third change-over switch 415 is switched according to the processing situations of the motion compensation coding between the high-resolution frame memory 412 and the low-resolution frame memory 414 to controllably extract data to be encoded. As a result, the single coder circuit can be operated on a time divisional basis to encode video data having different resolutions.

Figure 9A:
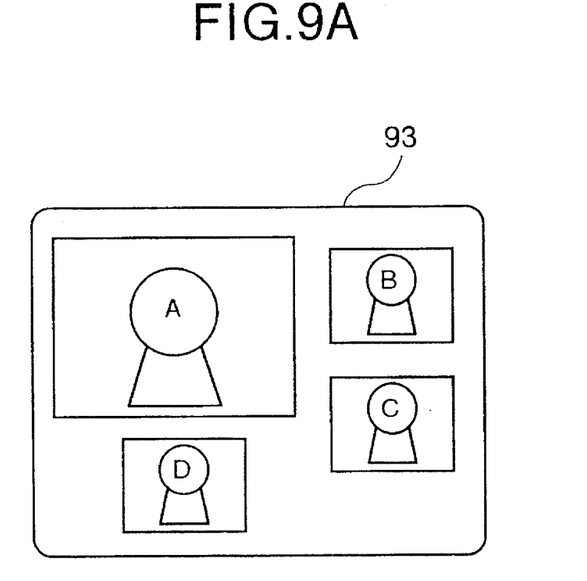
FIGS. 9A and 9B show examples of video display in the present invention.
Figure 9B:
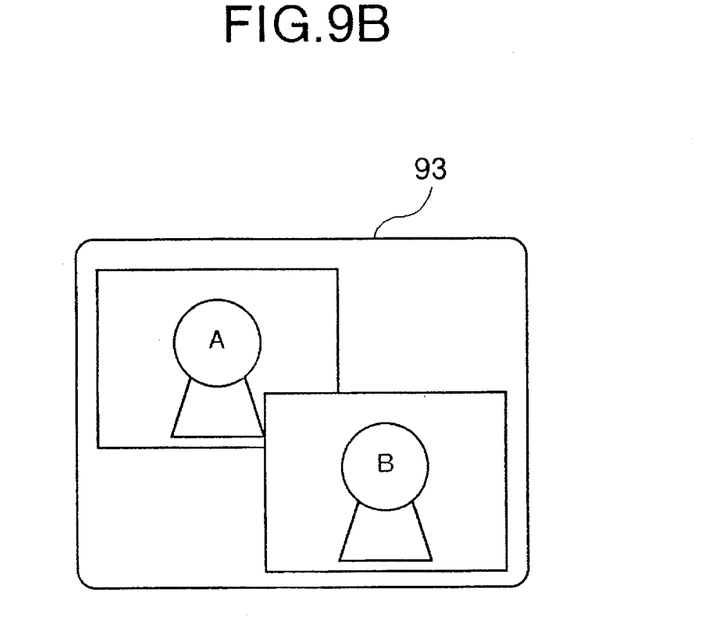

FIGS. 9A and 9B show examples of video displays in the embodiment of FIG. 6. FIG. 9A shows a display screen 93 when, for example, two sorts of video qualities of high and low resolutions are designed to be selected and video conference is carried out among 5 sites. The multi-point video synthesis circuit 91 comprises two video-frame memories each of which can store therein the high-resolution video data corresponding to one site or the low-resolution video data corresponding to four sites. The multi-video output circuit 92 acts to extract the video data of the respective sites from the frame memories of the multi-point video synthesis circuit 91 and to display them on a display unit attached with a controller in a multi-window form.

More in detail, FIG. 9A shows a display of a video signal with the high resolution at a site A and also shows displays of video signals with the low resolution at three sites B, C and D. It has been impossible to display the video signals of all the sites with the low resolution in the prior art multi-point visual communication. However, in accordance with the present invention, the video qualities of the party sites can be selected and displayed with respectively different resolutions. In the latter case, the video data of the site A, when using the one surface frame memory, is displayed on the screen; while, the video data of the three sites B, C and D, when using the other frame memory, are displayed on the screen. FIG. 9B shows only the video signals of only the sites A and B with the high resolution, which uses the two surface frame memories for the video image display of the two sites. In this case, the video images of the sites C and D cannot be displayed, but when the frame memories of the multi-point video synthesis circuit 91 are increased, the video image display of all the sites can be realized. The above has been given merely as examples of the video image display in the present invention. Thus, the present invention is featured in that how the video images are actually located and displayed can be freely modified according to users' preference.

As has been explained in the foregoing, in accordance with the embodiment of FIG. 6, the multi-point visual communication similar to the embodiment of FIG. 1 can be realized and the users of the respective sites, through a keyboard or the like of a controller connected with the multi-point visual communication system, can issue an instruction indicative of the start and end of the multi-point visual communication, the selection of the party video quality or the composition of the party video signals. Further, since various sorts of coding parameters are also adaptively controlled simultaneously with the control of the adaptive filter circuit 11, a comparatively high quality of video signal can be transmitted to other sides when viewed from the video information quantity. In this connection, the filter coefficients may be modified for every field or frame or depending on the characteristic of the video signal, may be the same filter coefficients for a period covering several fields. In the present embodiment, in particular, since video data corresponding to two sorts of resolution can be obtained through the real-time video signal processing, different qualities of video information can be transmitted to the respectively different sites substantially at the same time. In addition, the present embodiment has an advantage that since the filtering operation is based on the repetitive operation of the same circuit, the circuit scale can be minimized.

Although the above explanation has been made in connection with the case where two sorts of video qualities of the high and low resolutions are selected in the embodiment of FIG. 6, the same explanation can hold true for the case where 3 or more sorts of video qualities are to be transmitted. Further, the multi-point visual communication system of the present embodiment can not only form a multi-point visual conference system but also be applied to such a multi-point visual transmission system of a demand type that transmits different qualities of video signals to a plurality of sites according to request of the sites.

Though the embodiments of the present invention have been explained in connection with the case where the invention is connected to the plurality of sites through the digital telecommunication network to transmit the video information thereto, it will be appreciated that the network can be a public or private one and the present invention can be substantially similarly applied to any multi-point visual communication systems using analog lines.

In accordance with the present invention, since the quality of a video signal to be transmitted from its own site can be selected according to users' demands, there can be realized such multi-point visual communication system that can transmit video signals of qualities satisfied by the users of the respective sites while suppressing excessive increase of the video information quantity. Further, since the filtering operation of the video signal can be carried out taking both the characteristic of the video signal to be transmitted and the telecommunication network situations into consideration, the spatial frequency characteristic of the video signal to be transmitted can be adaptively controlled and thus a comparatively high quality of multi-point visual communication can advantageously be achieved when viewed from the information quantity.

The invention has been described with reference to the preferred and alternate embodiments. Obviously, modifications and alternations will occur to those of ordinary skill in the art upon reading and understanding the present invention. It is intended that the invention be construed as including all such modifications and alternations in so far they come with the scope of the appended claims or the equivalent thereof.

What is claimed is:

1. A multi-point visual communication system installed within a visual communication terminal for communicating video information with a plurality of other video sites via a communication network, comprising:

a filter for operatively producing output video signals having different qualities relative to each other by processing an input video signal to be transmitted to said other video sites;

a coder for converting said output video signals into coded output video signals;

interface means for selectively transmitting said coded output video signals to said other video sites through said communication network and for receiving coded video signals and request signals generated by said other video sites from said communication network;

a decoder for converting coded video signals received from said communication network by said interface means into video signals;

means for synthesizing said video signals converted by said decoder into a field or frame of a video signal; and a controller for controlling said filter depending upon a request from one of said other sites so as to adapt a quality of said output video signals to said request.

2. A multi-point visual communication system as set forth in claim 1, wherein a characteristic of said filter is switched for every field or frame of a video signal so as to produce different quality of output video signals in time division.

3. A multi-point visual communication system as set forth in claim 2, wherein the characteristic of said filter is switched during a field flyback period or during a frame flyback period of the video signal to be transmitted.

4. A multi-point visual communication system as set forth in claim 1, wherein said filter performs digital signal processing operation over an operational zone of m×n pixels of a video signal to be transmitted as one block and the size of said operational zone is varied according to the characteristic of said filter.

5. A multi-point visual communication system as set forth in claim 1, wherein said filter comprises:

an analog filter for varying quality of said output video signals according to a characteristic of said analog filter controlled by said controller depending upon the request from said other video site.

6. A multi-point visual communication system as set forth in claim 1, wherein said filter comprises:

means for adaptively varying a spatial resolution characteristic and a time resolution characteristic of said output video signals under a control by said controller.

7. A multi-point visual communication system as set forth in claim 1, said filter comprises:

means for storing a plurality of layered spatial frequency bands; and means for varying filter coefficients for the respective layers to adaptively control a quantity of said output video signals.

8. A multi-point visual communication system as set forth in claim 1, wherein said coder includes means for coding said output video signals into said coded output video signals based on a digital coding operation, and said controller includes means for adaptively controlling, according to both of an information quantity of said coded output video signal to be transmitted and a traffic situation of said communication network, a resolution of said filter which affects a quality of said output video signals and coding parameters for determining a filter characteristic.

9. A multi-point visual communication system for communicating video information with a plurality of other sites through a communication network, comprising:

filter means, having a plurality of variable spatial frequency characteristics, for operatively producing output video signals having different qualities relative to each other based on an input video signal to be transmitted to said other sites;

coding means for converting said output video signals into coded output video signals;

interface means for selectively transmitting said coded output video signals to said other sites through said communication network and for receiving request signals issued by said other sites from said communication network;

means for selecting at least one of said spatial frequency characteristic of said filter means in accordance with the requests from said other sites; and means for adaptively varying the spatial frequency characteristic depending upon a quantity of said coded output video signals to be transmitted and traffic situations of said communication network.

10. A video signal processing method in a multipoint visual communication system for transmitting video signals to a plurality of other video sites through a communication network, said method comprising the steps of:

producing at least a series of output video signals from a series of input video signals by controlling a spatial frequency characteristic of said output video signals through a filter circuit;

encoding the output video signals to obtain at least a series of coded video signals:

transmitting said coded video signals to said other video sites, selectively;

receiving a control signal for designating quality of said input signals from one of the other sites;

varying the spatial resolution characteristic of said filter circuit in accordance with said control signal so as to produce at least two series of output video signals one of which is to be transmitted to said one site which issued said control signal; and adaptively controlling said spatial frequency characteristic of said filter circuit depending upon a video information quantity of said coded video signals and situations of traffic of said communication network.

11. A video signal processing method as set forth in claim 10, wherein video signals of said at least two series of output video signals are alternately output from said filter circuit by switching said spatial frequency characteristic of said filter circuit for every field or frame of said video signal.

12. A multi-point visual conference system using said multi-point visual communication system as set forth in claim 1.

13. A multi-point visual transmission system of a demand type using said multi-point visual communication system as set forth in claim 1.

14. A communication terminal with a multi-point visual communication function for distributing video information to a plurality of remote video terminals via a communication network, comprising:

first means for operatively producing a plural series of output video signals with different video qualities relative to each other, by processing a series of source video signals to be distributed to said remote video terminals;

second means for converting said output video signals into coded video signals;

third means for selectively distributing said coded video signals to said remote video terminals through said communication network and for receiving through said communication network a control signal issued from one of said remote video terminals, said control signal including request information for designating quality of video signals to be received by said one remote video terminal;

control means for controlling said first means depending upon the control signal so that the quality of one of said output video signals adapt to the requested quality.

15. A communication terminal as set forth in claim 14, further comprising:

fourth means for converting coded video signals, which have been transmitted from said one remote video terminals and received by said third means, into video signals;

fifth means for synthesizing said video signals converted by said fourth means into a video signal for each field or frame of a video display; and sixth means for outputting said video signal from said fifth means to a display screen.

16. A communication terminal as set forth in claim 14, wherein said control means controls said first means so as to produce said plural series of output video signals in a time division fashion.

17. A communication terminal as set forth in claim 14, wherein said control means includes means for adaptively controlling said first means depending upon a traffic situation of said communication network.

18. A communication terminal as set forth in claim 14, wherein said control means includes means for adaptively controlling said first means depending upon a quality of said coded video signals and traffic situation of said communication network.

* * * * *